United States Patent
Haywood et al.

(10) Patent No.: US 8,275,936 B1
(45) Date of Patent: Sep. 25, 2012

(54) LOAD REDUCTION SYSTEM AND METHOD FOR DIMM-BASED MEMORY SYSTEMS

(75) Inventors: Christopher Haywood, Thousand Oaks, CA (US); Gopal Raghavan, Thousand Oaks, CA (US); Chao Xu, Thousand Oaks, CA (US)

(73) Assignee: Inphi Corporation, Westlake Village, CA (US)

( * ) Notice: Subject to any disclaimer, the term of this patent is extended or adjusted under 35 U.S.C. 154(b) by 409 days.

(21) Appl. No.: 12/563,308

(22) Filed: Sep. 21, 2009

(51) Int. Cl.
*G06F 12/00* (2006.01)
(52) U.S. Cl. ........ 711/105; 711/5; 711/154; 365/189.05
(58) Field of Classification Search ............ 711/5, 105, 711/154; 365/189.05
See application file for complete search history.

(56) References Cited

U.S. PATENT DOCUMENTS
7,685,364 B2 * 3/2010 Shaeffer et al. ............... 711/115
* cited by examiner

*Primary Examiner* — Jasmine Song
(74) *Attorney, Agent, or Firm* — Koppel, Patrick, Heybl & Philpott

(57) ABSTRACT

A load reduction system and method for use with memory systems which include one or more DIMMs, each of which includes a circuit arranged to buffer data bytes being written to or read from the DIMM, with the system nominally organized such that the bytes of a given data word are conveyed to the DIMMs via respective byte lanes and stored in a given rank on a given DIMM. The system is arranged such that the DRAMs that constitute a given rank are re-mapped across the available DIMMs plugged into the slots, such that a data word to be stored in a given rank is striped across the available DIMMs, thereby reducing the loading on a given byte lane that might otherwise be present. The system is preferably arranged such that any given byte lane is wired to no more than two of the DIMM slots.

13 Claims, 7 Drawing Sheets

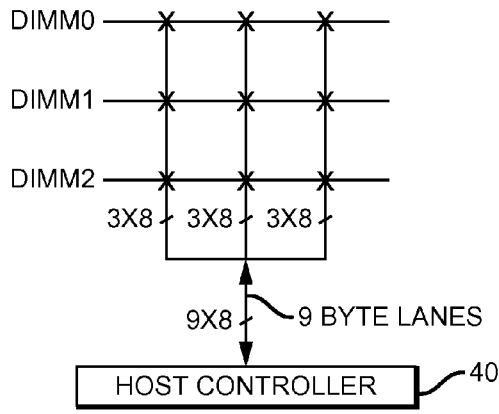
FIG. 4a
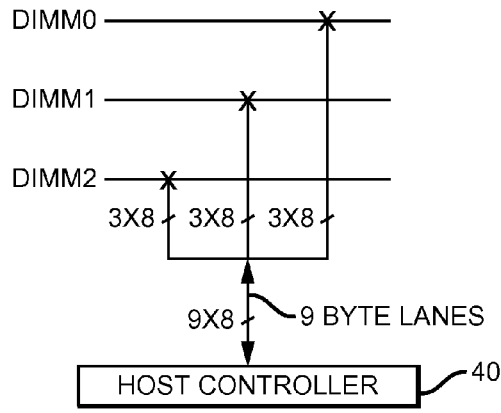
FIG. 4b
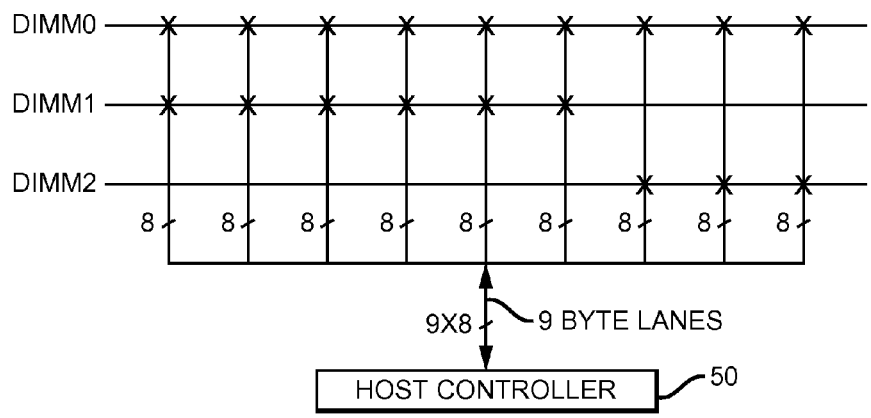
FIG. 5a
FIG. 5b

FIG. 5c

|       | Byte 0 | Byte 1 | Byte 2 | Byte 3 | Byte 4 | Byte 5 | Byte 6 | Byte 7 | Byte 8 |
|-------|--------|--------|--------|--------|--------|--------|--------|--------|--------|
| DIMM2 | X      | X      | X      |        |        |        |        |        |        |
| DIMM1 |        |        |        | X      | X      | X      | X///   | X///   | X///   |
| DIMM0 | X///   | X///   | X///   | X///   | X///   | X///   | X      | X      | X      |

TWO DIMMS, RANK 0

FIG. 5d

|       | Byte 0 | Byte 1 | Byte 2 | Byte 3 | Byte 4 | Byte 5 | Byte 6 | Byte 7 | Byte 8 |
|-------|--------|--------|--------|--------|--------|--------|--------|--------|--------|
| DIMM2 | X      | X      | X      |        |        |        |        |        |        |
| DIMM1 |        |        |        | X///   | X///   | X///   | X///   | X///   | X///   |
| DIMM0 | X///   | X///   | X///   | X      | X      | X      | X      | X      | X      |

TWO DIMMS, RANK 1

FIG. 5e

|       | Byte 0 | Byte 1 | Byte 2 | Byte 3 | Byte 4 | Byte 5 | Byte 6 | Byte 7 | Byte 8 |
|-------|--------|--------|--------|--------|--------|--------|--------|--------|--------|
| DIMM2 | X///   | X///   | X///   |        |        |        |        |        |        |
| DIMM1 |        |        |        | X      | X      | X      | X///   | X///   | X///   |
| DIMM0 | X      | X      | X      | X///   | X///   | X///   | X      | X      | X      |

THREE DIMMS, RANK 0

FIG. 5f

|       | Byte 0 | Byte 1 | Byte 2 | Byte 3 | Byte 4 | Byte 5 | Byte 6 | Byte 7 | Byte 8 |
|-------|--------|--------|--------|--------|--------|--------|--------|--------|--------|
| DIMM2 | X///   | X///   | X///   |        |        |        |        |        |        |
| DIMM1 |        |        |        | X      | X      | X      | X///   | X///   | X///   |
| DIMM0 | X      | X      | X      | X///   | X///   | X///   | X      | X      | X      |

THREE DIMMS, RANK 1

FIG. 5g

|       | Byte 0 | Byte 1 | Byte 2 | Byte 3 | Byte 4 | Byte 5 | Byte 6 | Byte 7 | Byte 8 |
|-------|--------|--------|--------|--------|--------|--------|--------|--------|--------|
| DIMM2 | X///   | X///   | X///   |        |        |        |        |        |        |
| DIMM1 |        |        |        | X      | X      | X      | X///   | X///   | X///   |
| DIMM0 | X      | X      | X      | X///   | X///   | X///   | X      | X      | X      |

THREE DIMMS, RANK 2

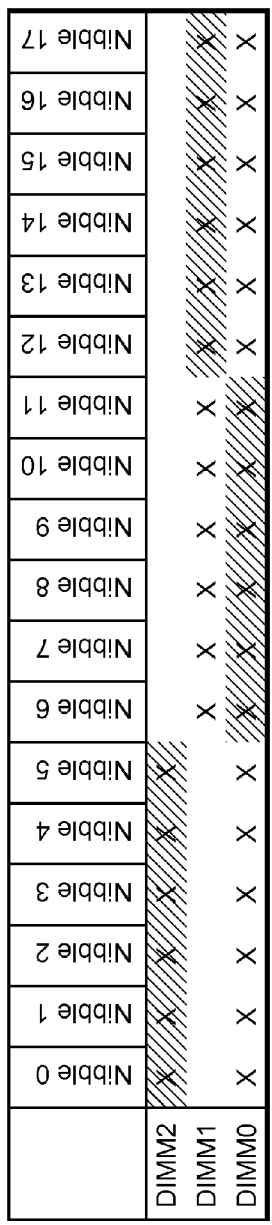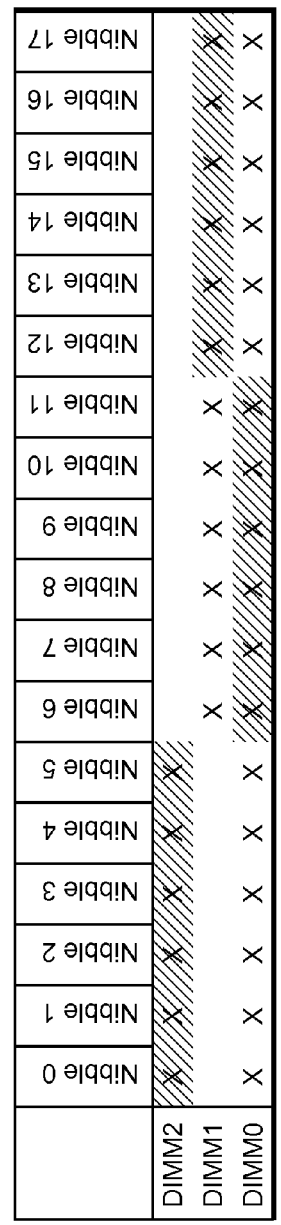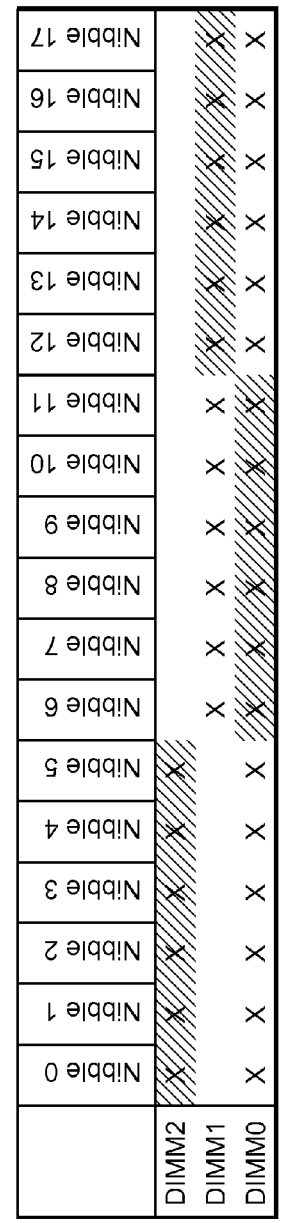

|       | Byte 0 | Byte 1 | Byte 2 | Byte 3 | Byte 4 | Byte 5 | Byte 6 | Byte 7 | Byte 8 |
|-------|--------|--------|--------|--------|--------|--------|--------|--------|--------|
| DIMM3 | X | X | X | | | | | | |
| DIMM2 | | | | | | | X | X | X |
| DIMM1 | X | X | X | X | X | X | | | |
| DIMM0 | | | | X | X | X | X | X | X |

TWO DIMMS, RANK 0

|       | Byte 0 | Byte 1 | Byte 2 | Byte 3 | Byte 4 | Byte 5 | Byte 6 | Byte 7 | Byte 8 |
|-------|--------|--------|--------|--------|--------|--------|--------|--------|--------|
| DIMM3 | X | X | X | | | | | | |
| DIMM2 | | | | | | | X | X | X |
| DIMM1 | X | X | X | X | X | X | | | |
| DIMM0 | | | | X | X | X | X | X | X |

TWO DIMMS, RANK 1

|       | Byte 0 | Byte 1 | Byte 2 | Byte 3 | Byte 4 | Byte 5 | Byte 6 | Byte 7 | Byte 8 |
|-------|--------|--------|--------|--------|--------|--------|--------|--------|--------|
| DIMM3 | X | X | X | | | | | | |
| DIMM2 | | | | | | | X | X | X |
| DIMM1 | X | X | X | X | X | X | | | |
| DIMM0 | | | | X | X | X | X | X | X |

THREE DIMMS, ALL RANKS

|       | Byte 0 | Byte 1 | Byte 2 | Byte 3 | Byte 4 | Byte 5 | Byte 6 | Byte 7 | Byte 8 |
|-------|--------|--------|--------|--------|--------|--------|--------|--------|--------|
| DIMM3 | X | X | X | | | | | | |
| DIMM2 | | | | | | | X | X | X |
| DIMM1 | X | X | X | X | X | X | | | |
| DIMM0 | | | | X | X | X | X | X | X |

FOUR DIMMS, RANK 0

|   | Byte 0 | Byte 1 | Byte 2 | Byte 3 | Byte 4 | Byte 5 | Byte 6 | Byte 7 | Byte 8 |
|---|---|---|---|---|---|---|---|---|---|
| DIMM3 | ▨ | ▨ | ▨ | | | | | | |
| DIMM2 | | | | | | | ▨ | ▨ | ▨ |
| DIMM1 | X | X | X | ▨ | ▨ | ▨ | | | |
| DIMM0 | | | | X | X | X | X | X | X |

FOUR DIMMS, RANK 1

|   | Byte 0 | Byte 1 | Byte 2 | Byte 3 | Byte 4 | Byte 5 | Byte 6 | Byte 7 | Byte 8 |
|---|---|---|---|---|---|---|---|---|---|
| DIMM3 | ▨ | ▨ | ▨ | | | | | | |
| DIMM2 | | | | | | | ▨ | ▨ | ▨ |
| DIMM1 | X | X | X | X | X | X | | | |
| DIMM0 | | | | ▨ | ▨ | ▨ | X | X | X |

FOUR DIMMS, RANK 2

|   | Byte 0 | Byte 1 | Byte 2 | Byte 3 | Byte 4 | Byte 5 | Byte 6 | Byte 7 | Byte 8 |
|---|---|---|---|---|---|---|---|---|---|
| DIMM3 | ▨ | ▨ | ▨ | | | | | | |
| DIMM2 | | | | | | | X | X | X |
| DIMM1 | X | X | X | ▨ | ▨ | ▨ | | | |
| DIMM0 | | | | X | X | X | ▨ | ▨ | ▨ |

FOUR DIMMS, RANK 3

|   | Byte 0 | Byte 1 | Byte 2 | Byte 3 | Byte 4 | Byte 5 | Byte 6 | Byte 7 | Byte 8 |
|---|---|---|---|---|---|---|---|---|---|
| SLOT0 | X | X | X | X | X | ▨ | ▨ | ▨ | ▨ |
| SLOT1 | ▨ | ▨ | ▨ | ▨ | ▨ | X | X | X | X |

TWO DIMMS, RANK 0

*FIG. 8b*

|   | Byte 0 | Byte 1 | Byte 2 | Byte 3 | Byte 4 | Byte 5 | Byte 6 | Byte 7 | Byte 8 |
|---|---|---|---|---|---|---|---|---|---|
| SLOT0 | ▨ | ▨ | ▨ | ▨ | ▨ | X | X | X | X |
| SLOT1 | X | X | X | X | X | ▨ | ▨ | ▨ | ▨ |

TWO DIMMS, RANK 1

LOAD REDUCTION SYSTEM AND METHOD FOR DIMM-BASED MEMORY SYSTEMS

BACKGROUND OF THE INVENTION

1. Field of the Invention

This invention relates generally to memory systems, and more particularly to system and method for reducing electrical loading in a DIMM-based memory system.

2. Description of the Related Art

Traditional computer systems, such as servers, workstations, desktops and laptops, all use pluggable memory which can be inserted into slots on the computer's motherboard as needed. The most common form of pluggable memory is the dual-inline memory module (DIMM). Historically, DIMMs contain multiple RAM chips—typically DRAM—each of which has a data bus width of 4 or 8 bits. A basic 'unbuffered' DIMM 10 is shown in FIG. 1. Typically, eight or nine 8-bit DRAM chips 12 (or twice as many 4-bit DRAM chips) are arranged in parallel to provide the DIMM with a total data bus width of 64 or 72 bits; the data bus, typically referred to as the 'DQ' bus, is connected to a host controller 14. Each arrangement of 64 or 72 data bits using DRAM chips in parallel is termed a 'rank' 16. The DRAM chips within a DIMM may be connected in a parallel arrangement—which may include stacking of DRAM chips within the same package—to provide additional ranks (18).

A command/address (CA) bus (not shown) also runs between the host controller and the DIMMs; the CA and DQ busses together form a 'system' bus. With a basic unbuffered DIMM, the CA bus is connected to every DRAM on the DIMM. As a result, there is a high electrical load on the CA bus, given by the product of the number of DRAMs times the number of ranks. For the DQ bus, the number of electrical loads is equal to the number of ranks.

For higher performance, 'registered' DIMMs (RDIMMs) may be used. Here, a special buffer device is used to drive the CA bus to the DRAMs. When so arranged, the number of electrical loads on the system bus will be 1 CA load for each DIMM and 1 DQ load for each rank.

A newly emerging technology is employed in a 'load reduction' DIMM (LR-DIMM), an example of which is illustrated in FIG. 2. An LR-DIMM 20 uses a logic device 22 to buffer the DQ signals between the DIMM ranks and the system channel, as well as provide the function of the buffer device of an RDIMM. Logic device 22 may be, for example, a single device such as the iMB (isolating Memory Buffer) from Inphi Corporation. When so arranged, there is only one electrical load on the DQ bus, and one load on the CA bus.

As noted above, a DIMM may contain multiple ranks, and multiple DIMMs may be fitted into a computer system. However, the ranks are fixed in position which gives rise to some non-optimal system constraints:

- each system channel connected to a group of n DIMMs will have n loads on the interconnecting channel. This may limit the maximum operating frequency of a given DIMM configuration due to signal integrity issues with either the CA bus, the DQ bus, or both.
- when a rank of memory is accessed, all of the power and resulting heat is concentrated on a single DIMM, so each DIMM slot has to be designed to tolerate the instantaneous maximum power consumption of any DIMM. This means that external power delivery components and connections have to be able to handle the peak power of any DIMM that can be installed into the system; conversely, DIMMs that have a peak power above what the system can handle will necessarily be excluded.
- if a single DIMM is continually accessed, then the power and resulting heat is continuously concentrated; as such, each DIMM slot has to be designed to deal with the maximum heat dissipated by any DIMM in every DIMM slot.
- systems employ 'DQS strobe' signals, which are associated with each nibble or byte on the DQ bus. To properly control contention on the DQ bus, these signals must meet various requirements. For example, gaps are needed between DQS strobe signals, due, for example, to read and write runarounds which could be different from rank to rank on the same DIMM, or from DIMM to DIMM. Different gaps might also be needed for read to read and write to write, both for rank to rank on the same DIMM, as well as for DIMM to DIMM. The gaps could also be different depending on the DIMM configuration of the channel or system.

SUMMARY OF TEE INVENTION

The present invention is directed to a load reduction system and method for DIMM-based memory systems, which addresses the issues described above by re-mapping the RAM chips that constitute a rank, such that the rank is essentially striped across the available DIMMs fitted into the system.

The present method is for use with memory systems which include one or more DIMMs, each of which includes a memory buffer circuit arranged to buffer data bytes being written to or read from the DIMM, with the memory system nominally organized such that the bytes of a given data word are conveyed to the DIMMs via respective byte lanes and stored in a given rank on a given DIMM.

A system in accordance with the present invention includes a host controller and a plurality of DIMM slots for receiving respective DIMMs, with the host controller arranged to write data to and read data from DIMMs plugged into the slots. Wiring, typically interconnection traces on a motherboard to which the host controller and DIMM slots are mounted, provides byte lanes between the host controller and the DIMM slots via which data is written to and read from the DIMMs.

The system is arranged such that the RAM chips that constitute a given rank are re-mapped across the available DIMMs plugged into the slots, such that a data word to be stored in a given rank is striped across the available DIMMs. This serves to reduce the loading on a given byte lane that might otherwise be present. The system is preferably arranged such that any given byte lane is wired to no more than two of the DIMM slots, such that the loading on the byte lane is limited to no more than the electrical loads associated with two of the memory buffer circuits.

These and other features, aspects, and advantages of the present invention will become better understood with reference to the following description and claims.

BRIEF DESCRIPTION OF THE DRAWINGS

FIGS. 4a and 4b are diagrams illustrating the connections between the host controller and the DIMM slots for a conventional memory system and for a memory system per the present invention, respectively.

FIG. 5a is a diagram illustrating one possible way in which three DIMM slots can be wired to the host controller per the present invention.

FIGS. 5b-5g are tables depicting a possible arrangement of connections between host and DIMM slots for a three slot system, covering the mapping of ranks 0, 1 and 2 for populations of one, two and three DIMMs.

FIGS. 6a-6f are tables depicting a possible arrangement of connections between host and DIMM slots for a three slot system, covering the mapping of ranks 0, 1 and 2 for populations of one, two and three DIMMs, for systems employing x4 DRAMs.

FIGS. 7a-7g are tables depicting a possible arrangement of connections between host and DIMM slots for a four slot system, covering the mapping of ranks 0, 1, 2 and 3 for populations of two, three and four DIMMs.

FIGS. 8a-8b are tables depicting a possible arrangement of connections between host and DIMM slots for a two slot system, covering the mapping of ranks 0 and 1 for two DIMMs.

DETAILED DESCRIPTION OF THE INVENTION

The present method and system is for use with memory systems which include one or more DIMMs that plug into respective slots. Each DIMM includes a memory buffer circuit such as an iMB from Inphi Corporation, arranged to buffer data bytes being written to or read from the DIMM by a host controller, via the DQ bus for example; the memory buffer is also preferably arranged to serve as an interface for the system's command/address (CA bus). Conventionally, such a memory system is organized such that the bytes of a given data word are conveyed to the DIMMs via respective byte lanes that run between the host controller and every DIMM slot, and are stored in a given rank on a given DIMM. However, as noted above, this arrangement can give rise to problems concerning, for example, operating frequency, power consumption, heat dissipation and system timing.

These issues are addressed by re-mapping the RAM chips that constitute a given rank across the available DIMMs, such that a data word to be stored in a given rank is striped across the available DIMMs; the RAM chips are referred to herein as DRAM, though other types of RAM might also be used. Re-mapping the ranks in this way serves to reduce the loading on a given byte lane that might otherwise be present.

Figure 1:
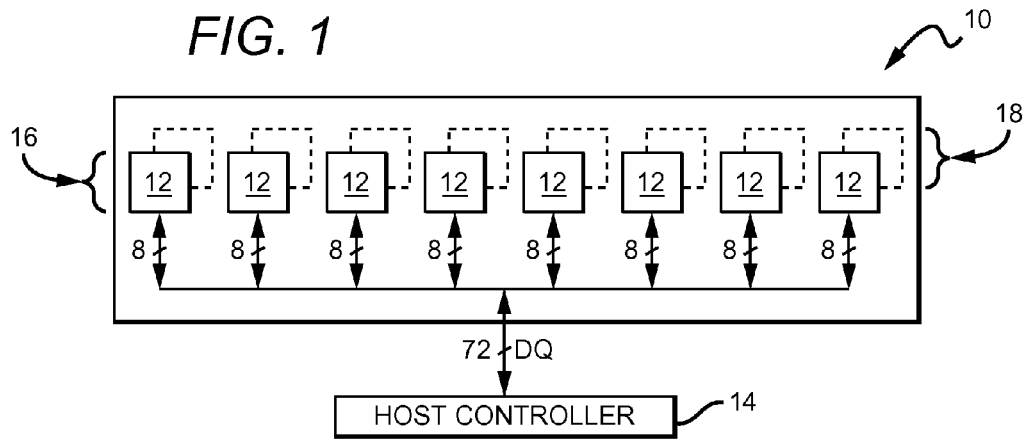
FIG. 1 is a block/schematic diagram of a memory system which employs unbuffered DIMMs.
Figure 2:
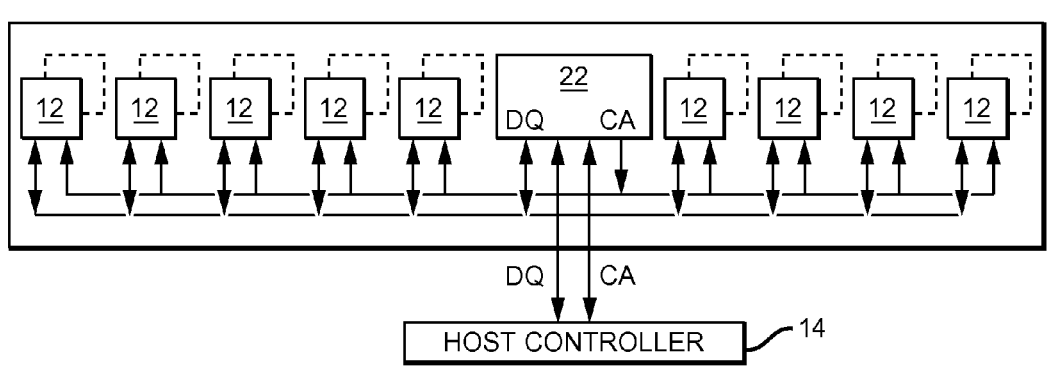
FIG. 2 is a block/schematic diagram of a memory system which employs LR-DIMMs.
Figure 3:
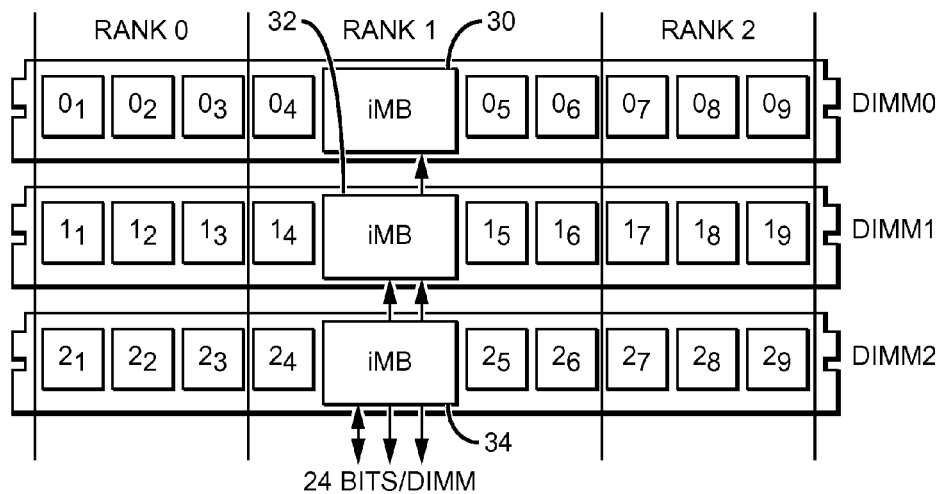
FIG. 3 is a diagram illustrating the re-mapping concepts of the present invention.

An example of this approach is illustrated conceptually in FIG. 3. Three DIMMs (DIMM0, DIMM1, DIMM2) are shown in this example, each of which includes a memory buffer circuit (30, 32, 34) and nine DRAMs ($0_1 \ldots 0_9, 1_1 \ldots 1_9, 2_1 \ldots 2_9$).

Conventionally, the nine DRAMs within each DIMM would constitute a rank; for example, DRAMs $0_1 \ldots 0_9$ would form rank 0, DRAMs $1_1 \ldots 1_9$ would form rank 1, and DRAMs $2_1 \ldots 2_9$ would form rank 2. A data word made up of nine bytes would be stored in one of the ranks; the specific rank would be specified via a 'chip select' (CS) signal provided to each rank.

Here, however, the DRAMs that constitute a given rank are re-mapped across the available DIMMs, such that a data word to be stored in a given rank is striped across the available DIMMs. For example, the system might arranged such rank 0 consists of DRAMs $0_1 \ldots 0_3$ of DIMM0, DRAMs $1_1 \ldots 1_3$ of DIMM1, and DRAMs $2_1 \ldots 2_3$ of DIMM2. A data word having nine bytes (bytes 0 . . . 8) might be stored as follows:
  bytes 0, 1 and 2 in DRAMs $0_1, 0_2, 0_3$, respectively;
  bytes 3, 4 and 5 in DRAMs $1_1, 1_2, 1_3$, respectively; and
  bytes 6, 7 and 8 in DRAMs $2_1, 2_2, 2_3$, respectively.

Similarly, rank 1 could be re-mapped such that it consists of DRAMs $0_4 \ldots 0_6, 1_4 \ldots 1_6$, and $2_4 \ldots 2_6$, and rank 2 could be re-mapped such that it consists of DRAMs $0_7 \ldots 0_9, 1_7 \ldots 1_9$, and $2_7 \ldots 2_9$. In this way, 24 bits of the data word are stored in each of the three DIMMs.

Note that DIMM numbering, DRAM numbering and byte numbering are completely arbitrary.

As previously noted, the bytes of a data word are conveyed between a host controller and the DIMMs via respective byte lanes. In this example, the nine byte lanes can be distributed across the three DIMMs; when so arranged, each byte lane is subject to only one electrical load, as three bytes would be routed from the host controller for each of the three DIMMs.

This is illustrated in the diagrams shown in FIGS. 4a and 4b. FIG. 4a depicts a conventional arrangement, in which each of the nine 8-bit byte lane must be connected between the host controller 40 and each of the three DIMM slots (DIMM0, DIMM1, DIMM2—connections indicated by an 'X').

However, in FIG. 4b, wiring between host 40 and the DIMM slots only need be provided as shown, with three byte lanes wired to each of the three DIMM slots. Thus, the present method reduces the amount of wiring—typically located on a motherboard to which the host controller and DIMM slots are mounted—that is needed between the host and the slots.

Note that the example illustrated in FIG. 4b is likely to be impractical, since it requires that all three DIMM slots be filled.

In order to implement the present method, the memory buffer circuit must have the capability to route data bytes to different byte lanes and thereby different DRAMs for data reads, and vice-versa routing for writes—as a function of the original destination rank. Along with the wiring between host controller and DIMM slots, this is part of the re-mapping process, the control of which is shared across the memory buffer devices.

Note that DIMMs used with the present method are not limited in the number of ranks they can support. For example, a traditional DIMM that contains four ranks of DRAMs, with each rank containing, for example, nine 8-bit DRAM components for a total of 36 DRAMs, can be re-mapped using the techniques described above.

In order to support multiple and various DIMM populations, as well as alternate system options, the byte lanes do, in fact, have to be shared across the DIMM slots. In order to achieve maximum system clock rates, the maximum loading on any one byte lane is preferably limited to two electrical loads. The description that follows will show several exemplary configurations; however, many others could be conceived by applying the basic principles of the byte striping described herein. Note that most DIMM-based memory systems employ a population rule that DIMMs must be fitted starting with the DIMM slot that is furthest away from the host controller—i.e., the slot at the far end of the system bus—referred to herein as DIMM0. The next DIMM to be fitted (DIMM1) is installed in the slot just before DIMM0, and so on.

In the case of a system with three DIMM slots, it may be required to support a single DIMM alone, two DIMMs together, or three DIMMs when the slots are fully populated. One possible way in which the three slots can be wired to the host controller 50 is shown in FIG. 5a; as in FIG. 4, an 'X' represents a connection between the host and the DIMM slots.

To accommodate the case in which only one DIMM is installed (in DIMM0), all of the byte lanes must be connected to the DIMM0 slot, as shown in FIG. 5a. Another way to depict the connections between host and slots is by means of a table as shown in FIG. 5b. In this and subsequent tables of this sort, an "X" represents a connection between the DIMM slot indicated on the left and the byte lane connected to the host controller as indicated at the top, and the shading represents the byte lanes with which the memory buffer on the DIMM in that slot will be receiving and sending data to/from the host controller. The diagram in FIG. 5b depicts the three slot/one DIMM case; therefore, all of the connections to DIMM0 are shaded, as the single DIMM in this slot will store the entire data word (i.e., no striping).

If a second DIMM is used, it would be plugged into DIMM1. However, in accordance with the present invention, DIMM1 does not need to be connected to all 9 byte lanes, as the ranks can now be striped. One way (of potentially several) to map the ranks for this case is shown in FIG. 5c (which shows how rank 0 might be striped) and 5d (rank 1). This configuration would require 6 byte lanes to be wired to the DIMM1 slot. This is the preferred configuration because it allows for a minimum number of CS lines on the striped DIMMs. When so arranged, data words addressed to the first and second ranks might be stored as follows:

DIMM0: Rank 0 bytes 0-5 and Rank 1 bytes 0-2
DIMM1: Rank 0 bytes 6-8 and Rank 1 bytes 3-8

One alternative way to stripe the bytes for the two DIMM case requires only 5 lanes to be wired to DIMM1:

DIMM0: Rank 0 bytes 0-3, Rank 1 bytes 0-4
DIMM1: Rank 0 bytes 4-8, Rank 1 bytes 5-8

Another alternative could be employed if the DRAMs on the DIMMs are x4 devices. In this case the mapping requires only 9 nibbles to be wired to DIMM1:

DIMM0: Rank 0 nibbles 0-8, Rank 1 nibbles 0-8
DIMM1: Rank 0 nibbles 9-17, Rank 1 nibbles 9-17

To support the third slot (DIMM2), only three byte lanes are required to be wired to the connector. This is the example illustrated above in FIG. 4b. FIGS. 5e, 5f and 5g illustrate possible mapping arrangements for rank 0, rank 1, and rank 2, respectively, when three DIMMs are installed.

In summary the wiring to the DIMM slots in this example is:

DIMM0: 9 byte lanes
DIMM1: 6 byte lanes
DIMM2: 3 byte lanes

This wiring arrangement enables each byte lane to be subject to no more than 2 electrical loads, as follows:

DIMM0: bytes 0, 1, 2, 3, 4, 5, 6, 7, 8
DIMM1: bytes 3, 4, 5, 6, 7, 8
DIMM2: bytes 0, 1, 2

Obviously, when only a single DIMM slot is populated, no striping is needed.

Figure 6A:
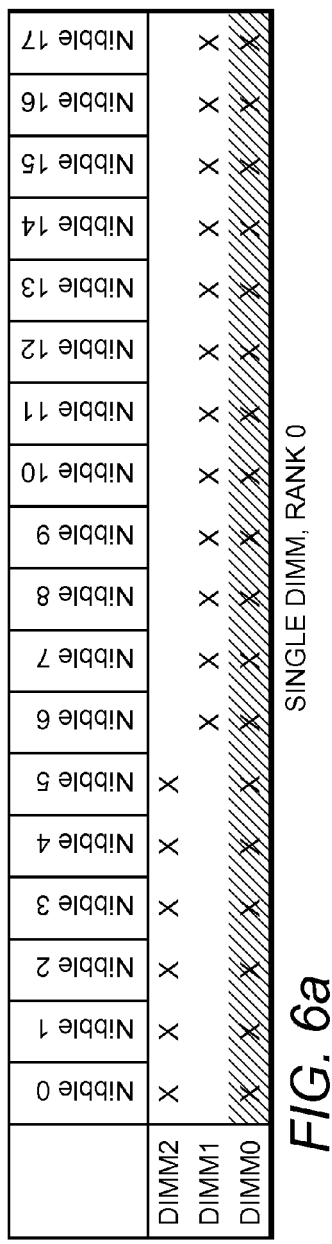
Figure 6B:
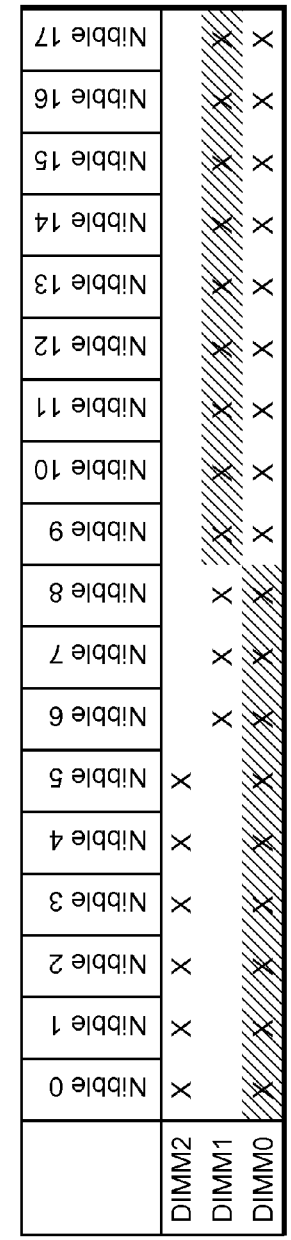
Figure 6C:
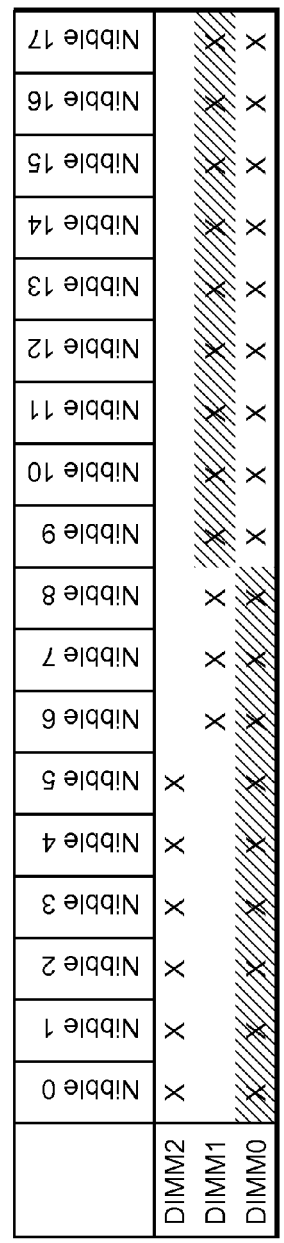

As mentioned, x4 DRAMs can also be striped. Possible mapping is shown in FIGS. 6a (single DIMM, rank 0), 6b and 6c (two DIMMs, ranks 0 and 1, respectively), and 6d, 6e and 6f (three DIMMs, ranks 0, 1 and 2, respectively).

To design a system that has four DIMM slots, but which still maintains the advantages of reducing electrical loads, a new population rule must be adopted: at least two of the DIMM slots must always be populated. To be consistent with the previous population rule of installing DIMMs starting with the slot furthest from the host controller, then when two DIMMs are used, they will be installed in DIMM0 and DIMM1. If three DIMMs are installed, they will be fitted into slots DIMM0, DIMM1 and DIMM2. Finally, four DIMMs will occupy all four slots (DIMM0, DIMM1, DIMM2 and DIMM3).

Exemplary mapping arrangements for a system with four DIMM slots is shown in FIGS. 7a-7g. FIGS. 7a and 7b show the two DIMM case, with the mapping of ranks 0 and 1 shown in FIGS. 7a and 7b, respectively. FIG. 7c shows the three DIMM case, which has been discussed extensively above. The four DIMM case is depicted in FIGS. 7d-7g, with the mapping of ranks 0, 1, 2 and 3 shown in FIGS. 7d, 7e, 7f and 7g, respectively.

Note that in FIGS. 7d-7g depicting the four DIMM case, each figure shows a grouping of three bytes for mapping functions. Using a 3 byte group as the fundamental option is preferred; however, doing so means that the ranks are striped across three DIMMs only. From a power distribution perspective, this is slightly less optimal than using all four DIMMs for all ranks.

A striped configuration as described herein may also be considered even if the system is designed with just 2 DIMM slots. All 9 byte lanes would be connected to both DIMM slots. However, the memory buffer device on the DIMM does not need to select and switch the byte lanes. Rather, the byte lanes can be connected directly from the DRAM devices to the edge connector, provided the DRAM is only a single load (this could either be a single DRAM die as exists today or could a device such as the upcoming "TSV" stacked DRAMs).

The control logic section of the memory buffer would still be required to correctly decode the CS signals for either 5 bytes or 4 bytes as already described above—i.e., 5 bytes from DIMM 0 and 4 from DIMM 1 and vice-versa for other rank decodes. One way to map the ranks for this case is shown in FIGS. 8a (which shows how rank 0 might be striped) and 8b (rank 1). This approach enables the power distribution advantages discussed above to be maintained. Load reduction is achieved by using a single DRAM or TSV DRAMs.

As noted above, the mapping diagrams shown above are merely exemplary; there are many ways in which re-mapping in accordance with the present method could be performed. It is only essential that the ranks be striped across the available DIMMs so as to reduce the loading on a given byte lane that might otherwise be present.

In order to further reduce the number of electrical loads to one per byte lane, a component may be added to the motherboard which has a similar function to that of the memory buffer circuit present on the DIMM. This additional component, referred to herein as a 'byte lane switch', serves to extend the functionality of the memory buffer circuit by adding more byte lanes to accommodate the number of DIMM slots needed in the system, hence increasing the switching functionality to map the nine lanes from the controller to the n lanes needed to support the DIMMs.

In general, when the host controller has m byte lanes and the system is arranged such that the re-mapping scheme requires a total of n connections between the host controller's byte lanes and the DIMM slots, a byte lane switch may be interposed between the host and slots. The switch has at least m I/O ports connected to the host controller's m byte lanes, and n I/O ports connected to the DIMM slots. The switch is arranged to buffer data between the host controller's byte lanes and the DIMM slots such that the loading on each of the host controller's byte lanes is limited to no more than the one electrical load associated with the byte lane switch. For example, for a four DIMM system that does not need to support a population of just one DIMM as shown in FIGS. 7d-7g:

1. 9 byte lanes are needed to connect to the host controller (m=9), and
2. 18 byte lanes are needed to connect to the DIMM slots (n=18).

Alternatively, if a four DIMM system does need to support a population of just one 1 DIMM (contrary to the population rule discussed above), then:

1. 9 byte lanes are needed to connect to the host controller (m=9), and
2. 21 byte lanes are needed to connect to the DIMM slots (n=21).

As capacity is increased above four DIMM slots, more byte lanes are required. Typically, three byte lanes per DIMM slot will be added, though the design could map any combination of byte lanes for each rank available in the system, provided there are nine available from the population of available DIMMs.

As noted above, a fundamental grouping option of three bytes is preferred for mapping functions. This serves to minimize the number of CS pins needed to drive the sub-rank groupings on each DIMM. Each variation of DIMM population could vary the number of DRAMs selected from each DIMM for each rank; this could add significant complexity to the rank to CS decode for each DIMM, to the point where each byte may need its own CS. In the case of multiple ranks on a DIMM, this is a very high burden in terms of pin count, signal routing and complexity.

By accepting that the minimum number of byte lanes routed from the controller to the "first" striped DIMM slot will be at least six, then the number of CS pins required for nine bytes on any DIMM will be limited to three. If there are n addressable ranks on the DIMM, then (n×3) CS signals are required from the memory buffer circuit.

A conventional memory channel with a known number of DIMM slots will have a fixed number of CS signals. Each CS signal will allow one rank to be accessed, so that the number of ranks in a particular channel is limited to the number of CS signals available.

When the ranks are striped across multiple DIMMs as described herein, then the rank decoding function is performed by the iMB on each DIMM, with the iMB performing the same function in parallel but selecting different DRAMs according to its DIMM position and configuration. In order for the iMB to perform this function, it is preferably arranged to receive address signals from the host controller instead of decoded CS signals. In addition, a single "channel select" signal is preferably employed to initiate the rank decode function in each iMB on each of the DIMMs. This will reduce the number of pins needed on the host controller on the channel, as eight CS signals can be replaced with three address lines and a single channel select signal, for a savings of four pins per channel. As more ranks are required, more address pins are needed, but more pins are saved on the host controller and channel. In general, when a memory system has x ranks which are enabled with respective CS signals which are nominally provided by the host controller, the system and memory buffer circuits are preferably arranged such that the memory buffer circuits 1) receive y address signals from the host controller in lieu of said CS signals, with $2^y \geq x$, 2) decode the address signals, and 3) provide the CS signals as needed to implement the re-mapping.

The new channel select signals will be common to all DIMMs and will provide consistent loading to the CA bus. Traditional channels with multiple DIMMs have 1 load for each DIMM on all the address and control signals, but the CS signals are most often connected in a point-to-point configuration. Hence, the traditional channel will have timing skews which are different for the CS signals compared to the address and control signals. By using all address lines and a single channel select signal, this problem no longer exists.

This arrangement also makes it possible for the number of ranks that can be addressed in a channel to be no longer limited by the number of CS signals. More address lines allow for more efficient rank expansion in a channel, which is now only limited by the addressing capability of the host controller and system design.

It should be noted that, even in cases where more than 1 DIMM will be needed to connect to all the byte lanes, there is always the option to run the system without all the lanes in use. This will reduce the available bandwidth of data to the controller, but provided the controller can accept the data on a subset of the byte lanes, the system will operate correctly. For example, assume a 2 DIMM configuration with half the data in each of the 2 slots (i.e., 1 load for every connection); when only 1 DIMM is fitted, there is half the bandwidth available.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A memory system which includes a plurality of DIMMs, each of which includes a plurality of random access memory (RAM) chips and a memory buffer circuit arranged to buffer and select/distribute a certain subset of data bytes being written to or read from said plurality of DIMMs, said system organized such that the bytes of a given data word are conveyed to said DIMMs via respective byte lanes that are not routed to all DIMMs and stored in a given distributed rank consisting of RAM chips on several DIMMs, comprising:

a host controller;
a plurality of DIMM slots for receiving respective DIMMs, said host controller arranged to write data to and read data from DIMMs plugged into said slots; and
wiring which provides byte lanes between said host controller and said plurality of DIMM slots via which data is written to and read from said DIMMs such that individual bytes may be read or written to RAM chips of different DIMMs as a function of said byte lane routing;
said system arranged such that the RAM chips that constitute a given rank are re-mapped across the available DIMMs plugged into said slots such that a data word to be stored in a given rank is striped across the available DIMMs so as to reduce the loading on a given byte lane that might otherwise be present.

2. The system of claim 1, wherein said system is arranged such that any given byte lane is wired to no more than two of said DIMM slots such that the loading on said byte lane is limited to no more than the electrical loads associated with one or two of said memory buffer circuits.

3. The system of claim 1, wherein said RAM chips comprise DRAM chips.

4. The system of claim 1, wherein a data word comprises 64 or 72 bits which are conveyed via eight or nine 8-bit byte lanes or via 16 or 18 4-bit byte lanes.

5. The system of claim 1, further comprising a command/address bus which conveys command and address data between said host controller and said DIMMs, said memory buffer circuits further arranged to receive and buffer said command and address data.

6. The system of claim 1, wherein said memory buffer circuits are arranged to route data bytes to respective RAM chips in accordance with said re-mapping.

7. The system of claim 1, wherein one or more of said DIMMs contains multiple ranks.

8. The system of claim 1, wherein said memory system includes two, three or four DIMM slots and said host controller is arranged to write data to and read data from DIMMs plugged into said two, three or four DIMM slots.

9. The system of claim 1, wherein said memory system includes four DIMM slots, said system arranged such that at least two of said DIMM slots must be populated with a DIMM.

10. The system of claim 1, wherein said host controller is mounted to a motherboard to which said DIMM slots are also mounted, said wiring comprising interconnection traces on said motherboard between said host controller and said DIMM slots.

11. A memory system which includes one or more DIMMs, each of which includes a plurality of random access memory (RAM) chips and a memory buffer circuit arranged to buffer data bytes being written to or read from said DIMM, said system nominally organized such that the bytes of a given data word are conveyed to said DIMMs via respective byte lanes and stored in a given rank consisting of parallel-connected RAM chips on a given DIMM, comprising:
  a host controller;
  a plurality of DIMM slots for receiving respective DIMMs, said host controller arranged to write data to and read data from DIMMs plugged into said slots; and
  wiring which provides byte lanes between said host controller and said DIMM slots via which data is written to and read from said DIMMs;
  said system arranged such that the RAM chips that constitute a given rank are re-mapped across the available DIMMs plugged into said slots such that a data word to be stored in a given rank is striped across the available DIMMs so as to reduce the loading on a given byte lane that might otherwise be present;
  wherein said host controller has m byte lanes and said system is arranged such that said re-mapping scheme requires a total of n connections between said host controller's byte lanes and said DIMM slots, further comprising a byte lane switch having m I/O ports connected to said host controller's m byte lanes and n I/O ports connected to said DIMM slots, said switch arranged to buffer data between said host controller's byte lanes and said DIMM slots such that the loading on each of said host controller's byte lanes is limited to no more than the one electrical load associated with said byte lane switch.

12. The system of claim 1, wherein said system has x ranks which are enabled with respective channel select (CS) signals which are nominally provided by said host controller, said system and memory buffer circuits arranged such that said memory buffer circuits 1) receive y address signals from said host controller in lieu of said CS signals, such that $2^y \geq x$, 2) decode said address signals, and 3) provide said CS signals as needed to implement said re-mapping.

13. A method of storing data in a memory system which includes a plurality of DIMM slots adapted to receive respective DIMMs, each of which includes a plurality of random access memory (RAM) chips and a memory buffer circuit arranged to buffer and select/distribute a certain subset of data bytes being written to or read from said plurality of DIMMs, said system organized such that the bytes of a given data word are conveyed to said DIMMs via respective byte lanes that are not routed to all DIMMs and stored in a given distributed rank consisting of RAM chips on several DIMMs, comprising:
  providing a host controller;
  providing a plurality of DIMM slots for receiving respective DIMMs, said host controller arranged to write data to and read data from DIMMs plugged into said slots;
  providing wiring which provides byte lanes between said host controller and said plurality of DIMM slots via which data is written to and read from said DIMMs such that individual bytes may be read or written to RAM chips of different DIMMs as a function of said byte lane routing; and
  re-mapping the RAM chips that constitute a given rank across the available DIMMs plugged into said slots such that a data word to be stored in a given rank is striped across the available DIMMs so as to reduce the loading on a given byte lane that might otherwise be present.

* * * * *